US009735979B2

(12) United States Patent
Al Amri

(10) Patent No.: US 9,735,979 B2
(45) Date of Patent: Aug. 15, 2017

(54) SYSTEM FOR PROVIDING ACCESS TO THE INTERNET

(71) Applicant: Moosa Eisa Al Amri, Dubai (AE)

(72) Inventor: Moosa Eisa Al Amri, Dubai (AE)

( * ) Notice: Subject to any disclaimer, the term of this patent is extended or adjusted under 35 U.S.C. 154(b) by 0 days.

(21) Appl. No.: 14/649,246

(22) PCT Filed: Dec. 3, 2013

(86) PCT No.: PCT/IB2013/060590
§ 371 (c)(1),
(2) Date: Jun. 3, 2015

(87) PCT Pub. No.: WO2014/027338
PCT Pub. Date: Feb. 20, 2014

(65) Prior Publication Data
US 2015/0319155 A1    Nov. 5, 2015

(51) Int. Cl.
*H04L 29/00* (2006.01)
*H04L 12/413* (2006.01)
*H04L 12/933* (2013.01)
*H04M 11/06* (2006.01)
*H04L 29/06* (2006.01)
*H04L 12/28* (2006.01)

(52) U.S. Cl.
CPC ........ *H04L 12/413* (2013.01); *H04L 12/2863* (2013.01); *H04L 12/2898* (2013.01); *H04L 49/15* (2013.01); *H04L 63/083* (2013.01); *H04M 11/062* (2013.01)

(58) Field of Classification Search
CPC ......... G06F 21/45; H04L 9/08; H04L 63/083; H04L 49/15
See application file for complete search history.

(56) References Cited

U.S. PATENT DOCUMENTS

| | | | |
|---|---|---|---|
| 6,711,138 B1 | 3/2004 | Pai et al. | |
| 7,337,219 B1* | 2/2008 | Meenan | H04L 12/2807 709/220 |
| 2003/0055990 A1* | 3/2003 | Cheline | H04L 63/0272 709/229 |
| 2005/0028012 A1* | 2/2005 | Amamiya | H04L 63/0209 726/4 |
| 2007/0271329 A1 | 11/2007 | Hirao et al. | |
| 2008/0015973 A1 | 1/2008 | Erisman | |

* cited by examiner

*Primary Examiner* — Brandon Hoffman
*Assistant Examiner* — Helai Salehi
(74) *Attorney, Agent, or Firm* — Sturm & Fix LLP

(57) ABSTRACT

A system for providing access to the internet, comprises a network of routers (R) hereinafter designated "new routers") wherein each new router (R) has a CPU (112) that has, or is associated with, a public area (142) that allows simultaneous access to the new router's CPU by more than one user account. The system is so arranged that a pre-registered user with a user account identified by an identifier, typically a user name and/or password, can access the internet from any new router (R) in the network by connecting to the public area (142) of the new router's CPU (112) and entering the account identifier of the pre-registered user account.

11 Claims, 7 Drawing Sheets

The current router Diagram:

The new Router Diagram 1:

The New Router Diagram – Model 2:

New Router Diagram – Model 3:

R →

SYSTEM FOR PROVIDING ACCESS TO THE INTERNET

FIELD OF THE INVENTION

This invention relates to a system for providing access to the internet, comprising a network of routers.

DESCRIPTION OF RELATED ART

Various routers are known. U.S. Pat. No. 6,711,138 describes a known digital subscriber line/home phoneline network router, comprising: a central processing unit; a digital subscriber line modem coupled to the central processing unit; a media access controller coupled to the central processing unit; a home phoneline networking physical interface coupled to the media access controller; a digital subscriber line analog front end coupled to the digital subscriber line modem; a home phoneline networking analog front end coupled to the home phoneline networking physical interface; and a customer premise equipment/telephone company interface coupled to the digital subscriber line analog front end and the home phoneline networking physical interface, wherein the media access controller communicates with a home phoneline network via the home phoneline networking physical interface, and wherein the digital subscriber line analog front end, the home phoneline networking analog front end, and the customer premise equipment telephone company interface are provided on a plug-in card.

Known routers like this have the limitation that they comprise a single CPU which serves all requests to access the internet using one account, that of the router's owner or possesser.

Currently used routers allow access and log in only for one account. Multi users can use the same where it is entered on a current or "prior art" router under one account submitted by the Internet service providers. The use by any individual for this is hindered by having to take permission to enter it, either by the payment of a sum or by having bought something from the restaurant or shop or center to get the Internet service which hampers using internet networks if the user or subscriber was out of reach of his original access point to the internet network.

US 2003/0055990 relates to a virtual private network (VPN) comprising a standard router.

US 2007/271329 relates to a command processing apparatus which has a CPU that determines whether or not a router is compliant with UPnP (Universal plug & play) and issues a "port releasing request".

US 2008/016007 relates to a wireless communication system wherein several mobiles are in communication with a router.

SUMMARY OF THE INVENTION

According to the invention, there is provided a system for providing access to the internet, comprising a network of routers (hereinafter designated "new routers") wherein each new router has at least one CPU (Central Processing Unit) which has or is associated with two separately accessible distinct areas with different access possibilities:

A first area which is a private area that allows access only to the new router's owner or possessor, said private area having an Internet Protocol (IP) address for the router's owner or possessor to access said private area and hence access the Internet; and A second area which is a public area that allows simultaneous access by more than one account, said public area having an IP address which is reserved for public users who have subscribed to the system and have a password and/or user name to access the new router's public area wherever the system is available and hence access to the Internet.

The system is so arranged that a pre-registered user with a user account identified by an identifier, typically a user name and/or password, can access the internet from any new router in the network by connecting to the public area of the new router's CPU and entering the account identifier of the pre-registered user account.

The system preferably comprises two CPU's, one with a private area and the other with a public area.

For each customer/subscriber the system will provide a password and/or user name, so the customer will use it to access the new router through the public area which is controlled by the public CPU area. The router's private area is reserved for the router's owner controlled by the private CPU.

The new router with two CPU's in this case has two IP addresses, one IP address for the owner and the other IP for the public users. All public users will be provided with a password and/or user name to access the new generation routers.

This new generation router will preferably have:

1—Two CPU's (one private CPU reserved for router's owner, the other public CPU reserved for public users)

2—Two IP's—a private IP for the router's owner to access the private CPU and a public/IP to access the public CPU which is reserved for public users who subscribe to the system and have a password and/or user name that can be used wherever this system exists whenever the system will be available.

The new router's CPU can have a plurality of public and private areas.

In one embodiment, at least the public area of the new router's CPU is provided by means of a USB dongle connected to a USB connector of an existing router or built-in the CPU of a new router where the existing CPU or new router CPU provides a private area. The dongle is preferably used with routers which have a CPU that has a private area, the dongle providing a public area that allows simultaneous access to the new router's CPU by more than one user account. For the new routers which are manufactured specially for the inventive system, the function of the dongle can be built-in the CPU that has, or is associated with, a public area that allows simultaneous access to the new router's CPU by more than one user account.

The system according to the invention may further comprise a user account server wherein each user, from his own territory, can open a user account identified by an identifier, typically a user name and/or password. This initially-created identifier, can then be used in the system with any of the new routers.

Servers and sub servers allow subscribers to login and register on the system, in order to save their records and personal information and other information. Based on that, the main server and/or sub-servers provide a new registration number which is the user name and password. Later on the main server and/or sub-servers send special software application related to the system and enable the system, in the user location, to allow the subscriber to log in to any router from the new routers. Then the main server and sub-servers provide an account for each subscriber in the system and start to calculate the subscription period and balance period of using the system.

Each user account preferably has its own bandwidth and the bandwidth of a user account or part of said bandwidth can be shared or shifted by the new routers in the public area. This provides an endless flow of sequence from one WiFi signal to the other, on the same system (i.e. continuous).

Also the main server and sub-servers regulate bandwidth shifting and transferring from and to the end user location.

Each user with a user account preferably is provided by the servers and/or sub-servers of the system with software (designated "WiFi Follows Me Software") that is arranged to search for new routers which are available in any territory and provide a list of available new routers for selection by the user.

The system can comprise this application software that is installable on mobile devices, laptops, computers, handheld devices, smart mobile phones, or any other device. The application software can be installed from known software markets or stores either online or otherwise. Software may have fees and charges which can be applied annually.

Another aspect of the invention is a new router of such a system, wherein each new router has at least one CPU (Central Processing Unit) which has or is associated with two separately accessible areas with different access possibilities:

A first area which is a private area that allows access only to the new router's owner or possessor, said private area having an Internet Protocol (IP) address for the router's owner or possessor to access said private area and hence access the Internet; and A second area which is a public area that allows simultaneous access by more than one account, said public area having an IP address which is reserved for public users who have subscribed to the system and have a password and/or user name to access the new router's public area wherever the system is available and hence access to the Internet, wherein the new router is so arranged that a user with a pre-registered user account identified by an identifier, typically a user name and/or password, can access the internet from any new router by connecting to the public area of the new router's CPU.

This invention provides a system and method and device that send wireless waves of Wifi or Wimax or any wireless network that is distributed to the geographic scope of any territory to which this system applies. This is done by returning router data and or server in reverse to a service provider through upload of router data in order to put this data and information of the internet to be used/exploited by participants of Internet service providers through new routers or new servers which have a characteristic to be accessible to more than one user, of different accounts on the same router.

The invention provides a new generation of routers that have a characteristic access or entry of more than one user/subscriber even if their accounts are different on the same router and/or server, and an account is created according to a system called "My Line Follows Me". The data is user or subscriber data and information relating to the router (PHYSICAL ADDRESS OR SERIAL NUMBER) or other data required for the performance of the system, in addition to the program which is loaded on the mobile phone or a computer or laptop or any other device suitable for accessing the Internet. One of the advantages of this program is to show available networks/lines so that the subscriber and/or user can access to one of these lines. After selecting a network, the program opens a screen "BROWSING" where data entry is required, for example entering the required username and password.

First example, if the person was a resident in a territory in area (A) and sets up an account for the internet in this region and he traveled to another area (B) in the same territory that applies this system or invention, the person first has to download the program "My Line Follows Me" which will search for the nearest router or server of the new generation that offers Internet service "Approach" or "Follow Me" in this area, where there is a search engine for this program looking for a router which applies the new system and displays them spontaneously to a user or subscriber whatever the device is. The user them selects a router that appears on his screen (Browser) and enters the user name and password or any required data from the Service Provider. After entering required data correctly and successfully the router allows him to access the Internet service even though he is in another area in the same territory as mentioned earlier. The system also regulates the relationship between Internet service providers on the local or international level through electronic clearing or any other system for organizing financial or other aspects.

Second example, if the person was a resident in the territory in area (A) and set up an account for the internet in this region and traveled to another area (B) in another territory that applies this system or invention, then the person first has to download the program "My Line Follows me" which will search for the nearest router of the new generation that offers Internet service "Approach" or "Follow Me" in this area, where there is a search engine for this program looking for a router that applies the new system and displays them spontaneously to a user or subscriber whatever the device is. The user then selects a router that appears on his screen (Browser) and enters a user name and password or any required data from the Service Provider. After entering required data correctly and successfully the router allows him to access the Internet service even though he is in another area in another territory as mentioned earlier. The system also regulates the relationship between Internet service providers on the local or international level through electronic clearing or any other system for organizing financial or other aspects.

In order to make the invention applicable, a new generation of routers will be distributed in different places, such as shopping malls or government centers or shops or on the streets on poles and in other places, for rebroadcasting transmitter to servers or routers in the area to cover the circles or rings of wireless covering all areas of the territory so that a large segment of users can take advantage of the new system or this invention without incurring any expenses or additional fees for Internet networks, whereas in the prior art a person is supposed to pay a fees or buy a cup of coffee or tea to provide him the internet access from coffee shop or restaurant or the mall owner ,or other public areas with a password for router in order to access the Web, whether he is in his territory or outside in order to enable him to access Internet service.

BRIEF DESCRIPTION OF THE DRAWINGS

The invention and a prior art example will be further described by way of example with reference to the accompanying drawings, in which.

DETAILED DESCRIPTION

Figure 1:
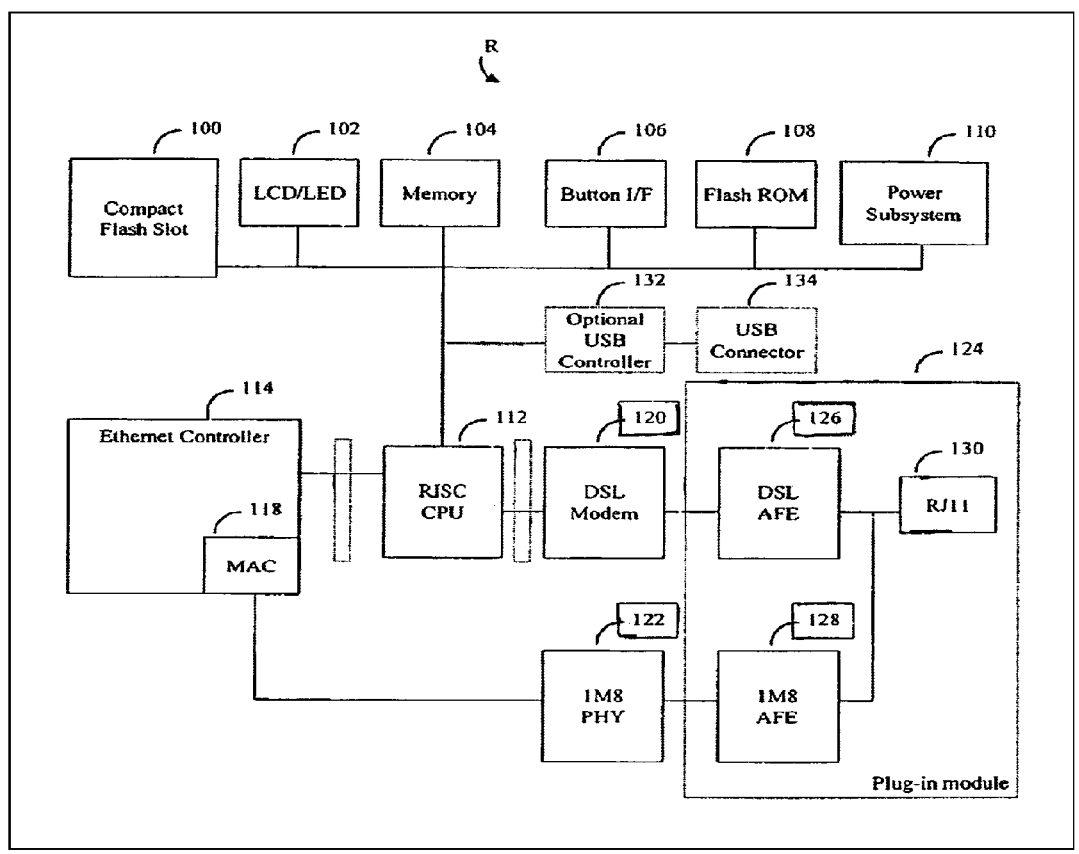
FIG. 1 is a block diagram of an exemplary hardware architecture of a prior art digital subscriber line/home phoneline network router.

As set out in U.S. Pat. No. 6,711,138, FIG. 1 shows an exemplary hardware architecture for a known type of digital subscriber line (DSL)/home phoneline network router R. The router R includes a reduced instruction set computer (RISC) central processing unit (CPU) 112 to handle the overall management of the router R. For example, the CPU 112 can handle DSL modem control, ATM (Asynchronous Transfer Mode) segmentation and reassembly (SAR) and other ADSL protocol processing, LAN (Local Area Network) protocol, and communications with a universal serial bus (USB) controller. The CPU 112 is shown coupled to a Ethernet controller 114 and a DSL modem 120. The Ethernet controller 114 includes a media access controller (MAC) 118. Both the Ethernet controller 114 and the MAC 118 may be implemented in other ways. For example, the MAC 118 can be integrated with the CPU 112. In the disclosed embodiment, the MAC 118 is compliant with the I.E.E.E. 802.3 standard for 10 Mbps Ethernet networking. The MAC 118 is coupled to a 1M8 physical layer device 122. The 1M8 physical layer (PHY) device 122 is a home phoneline networking physical layer device, described in the Home Phoneline Networking Alliance (HPNA) 1M8 PHY Specification, Version 1.0. Alternatively, the 1M8 PHY 122 can conform to the 10 Mbps Home Phoneline Networking Alliance 2.0 Specification. The 1M8 PHY 122 enables home networking by allowing Ethernet packets to be transported over standard home telephone wiring using standard Ethernet CSMA/CD (Carrier Sense Multiple Access/Collision Detect) Media Access Control (MAC) procedures as specified in the I.E.E.E. 802.3 standard. The 1M8 PHY 122 serves as a home phoneline networking physical interface. The 1M8 PHY 122 and the MAC 118 together serve as a home phoneline networking device. An optional USB interface 1 321 134 may be designed into the router R as well for host connectivity.

As shown, the DSL modem 120 and the 1M8 PHY 122 may both be coupled to a plug-in module 124 containing a DSL analog front end (AFE) 126, a 1M8 AFE 128 and an RJ-11 jack 130. More particularly, the DSL modem 120 is coupled to the DSL AFE 126, and the 1M8 PHY 122 is coupled to the 1M8 AFE 128. Communication between the 1M8 PHY 122 and the MAC 118 is understood in the art. As an alternative to a plug-in configuration, the DSL AFE 126, 1M8 AFE 128 and RJ-11 jack 130 may be directly integrated into the router R. Instead of the RJ-11 jack, other types of customer premise equipment/telephone company interfaces might be used.

By integrating the 1M8 PHY 122, the 1M8 AFE 128, the MAC 118, the DSL modem 120, and the DSL AFE 126, the router R provides the appropriate hardware to enable home networking and DSL connectivity. DSL should be understood to refer to any of the technologies in the DSL family, such as symmetric DSL (SDSL), Asymmetric DSL (ADSL), High-Speed DSL (HDSL), and G. Lite. There can be variations in configurations for the router R depending on the particular DSL technology implemented. ADSL is currently the preferred standard in the industry. Further, the router R supports both home networking (PHY) layer functionality and Ethernet (MAC) layer functionality.

The CPU 112 is further coupled to a set of status light emitting diodes (LEDs) and a liquid crystal display (LCD) or light-emitting diode (LED) 102, a memory 104, a button interface (I/F) 106, a flash read only memory (ROM) 108, a power subsystem 110 and a compact flash slot 100. The LEDs 102 may include a home phoneline network indicator to indicate active home networking functionality and a DSL indicator to indicate active DSL connectivity.

The current router diagram shown in FIG. 1 comprises only one CPU 112 which serves all requests to access the internet by using one account, i.e. of the Router's owner or possesser.

Figure 2:
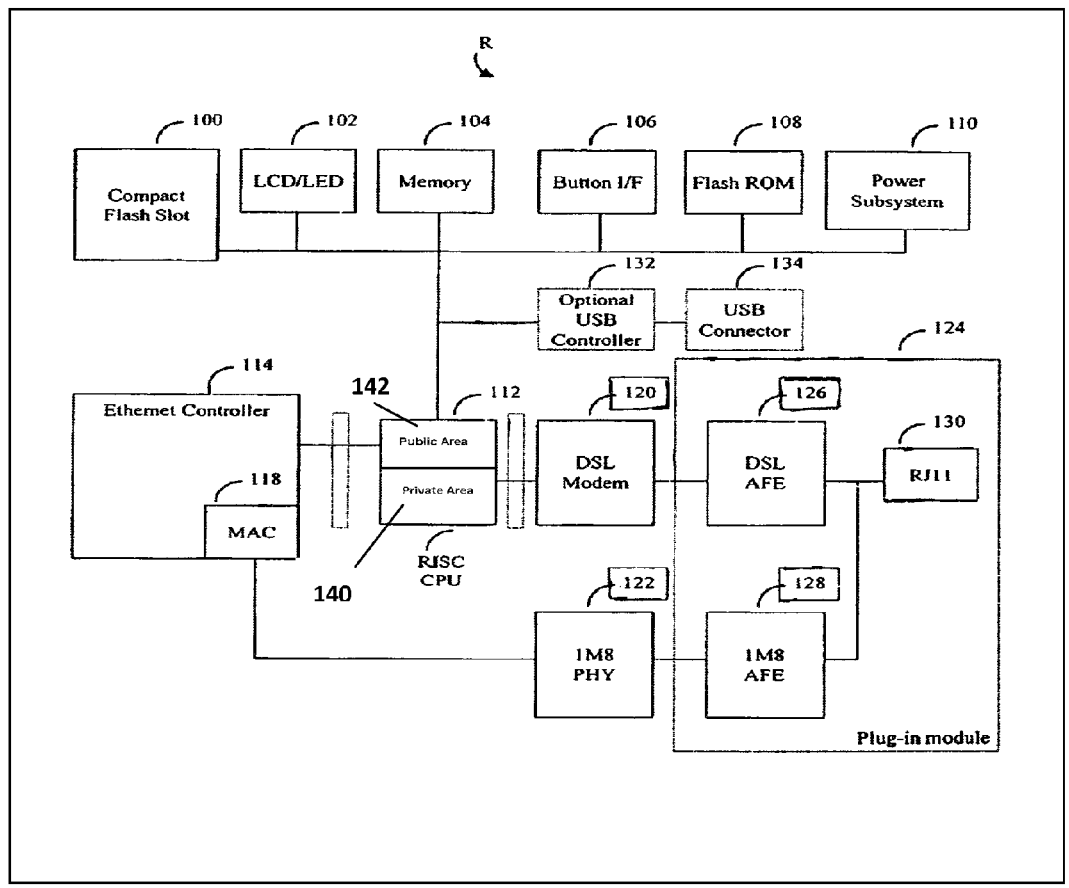
FIG. 2 is a block diagram of a router according to the invention with one CPU chipset divided in two areas (or two CPU's)

FIG. 2 shown the new router diagram with one CPU chipset but with the CPU divided in to two areas
1. A private area 140 that only operates for the Router's owner to access the internet through it.
2. A public area 142 that operates for anyone that has a "FollowMe" account to access the internet through it.

Alternatively, the private area 140 and the public area 142 could be provided by two respective CPU's.

Figure 3:
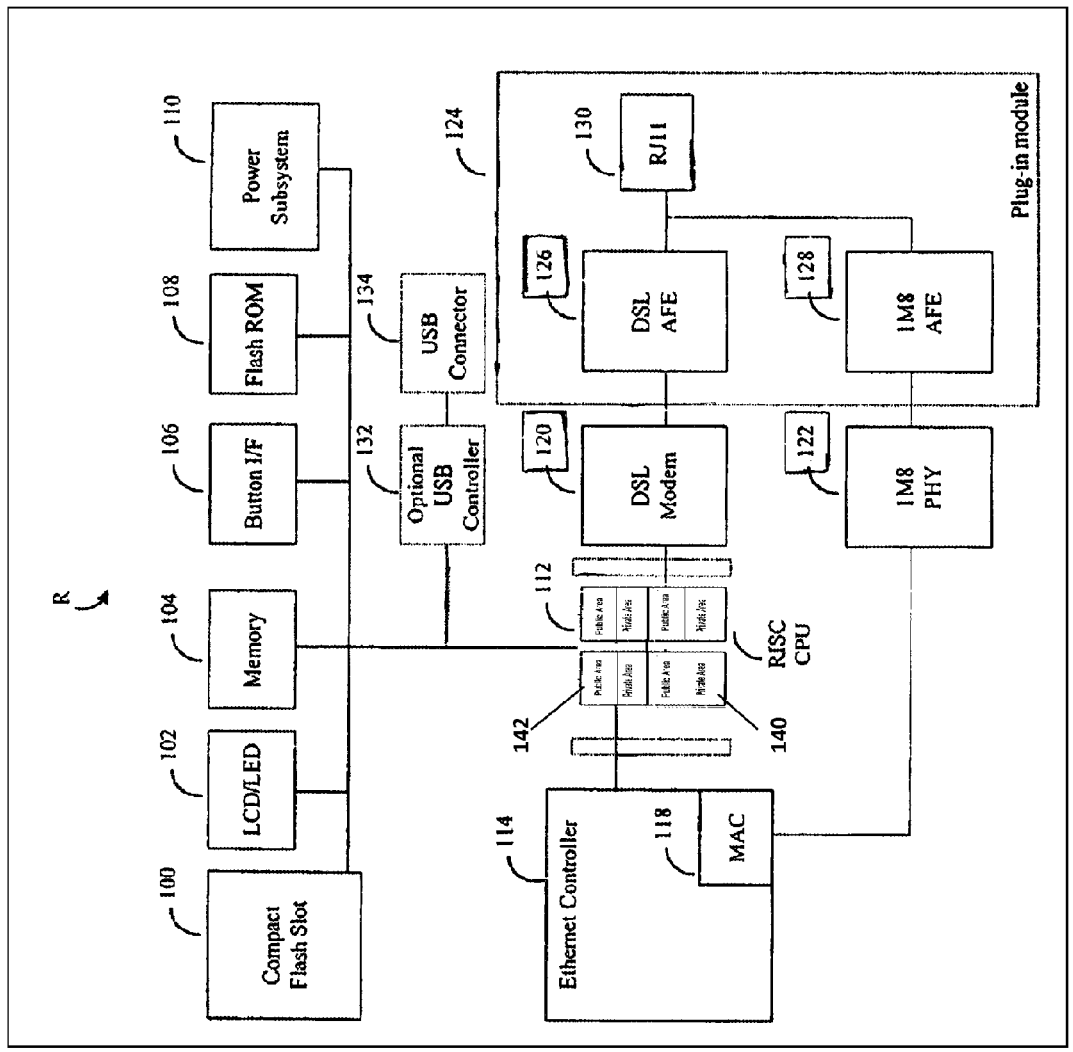
FIG. 3 is a block diagram of another router according to the invention with more than one CPU chipset, each CPU being divided in two areas (or several CPU's)

The new design for the router allows us to configure more than one account. FIG. 3 shown a new router diagram with more than one CPU chipset (namely four chipsets) and where each CPU is divided into two areas
1. A private area 140 that only operates for the Router's owner to access the internet through it
2. A public area 142 that operates for anyone have a "Follow Me" account to access the internet through it.

Alternatively, the private area 140 and the public area 142 could be provided by respective CPU's instead of divided CPU's.

The new design for the router allows us to configure more than one account.

Figure 4:
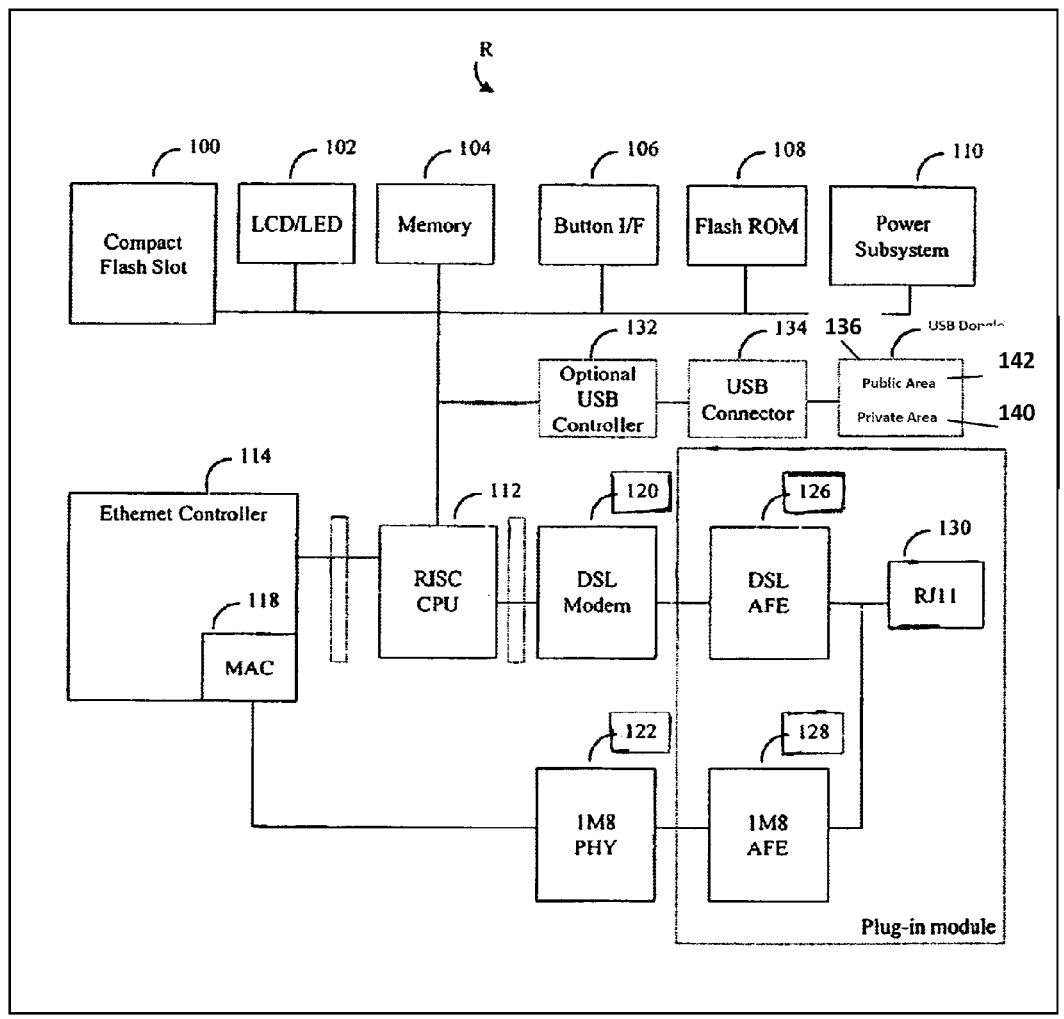
FIG. 4 is a block diagram of another router according to the invention where a USB dongle has been added.

FIG. 4 shows a diagram of another new router. The new design is same as the current router but only adding a new hardware device 136 (USB Dongle) through the USB controller 132 in the router. The USB Dongle 136 is a new CPU Chipset which is divided in to two areas 140, 142 that allows the users which have "Follow Me" accounts to access the internet through the USB Dongle configured in the current routers.

The USB (Universal Serial Bus) Dongle is a USB Device that attaches to an existing router through a USB port. For example, the dongle has a CPU reserved to handle a Public Area and the Router's CPU will handle the Private Area. So in this case, the USB Dongle will be considered as a second CPU to control a Public Area.

The new routers have the property to give internet access for more than one user with different internet accounts at the same time, whereas conventional routers allow access to more than one user under the same network only under one internet account only (not more than one internet account).

The system software ("Wifi Follows Me") is specially developed for the invention, and this software is tailored to the new generation of routers.

As stated previously, for each customer/subscriber the system will provide a password and/or user name, so the customer will use it to access the new router through the public area which is controlled by the public CPU area. The router's private area is reserved for the router's owner controlled by the private CPU.

The new router with two CPU's in this case has two IP addresses, one IP address for the owner and the other IP for the Public Users. As explained, all public users will be provided with a password and/or user name to access the new generation routers.

This new generation router will preferably have:
1—Two CPU's (one Private CPU reserved for the router's owner, the other Public CPU reserved for public users).
2—Two IP's—a private IP for the router's owner to access private CPU and a public/IP to access public CPU reserved for public users who subscribe to the system and have a password and/or user name that can be used wherever this system exists whenever the system will be available.

Figure 5:
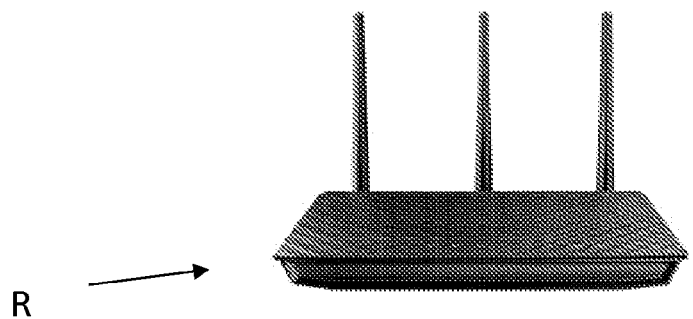
FIG. 5 is a schematic perspective view of the new router device that provides access to more than one subscriber.

FIG. 5 shows a new router device R that has a characteristic access by more than one subscriber or group with different accounts on the same router whereas the old router can be logged in or accessed more than one person but only under one account. The new routers can be accessed by more than one subscriber or group with different accounts.

Figure 6:
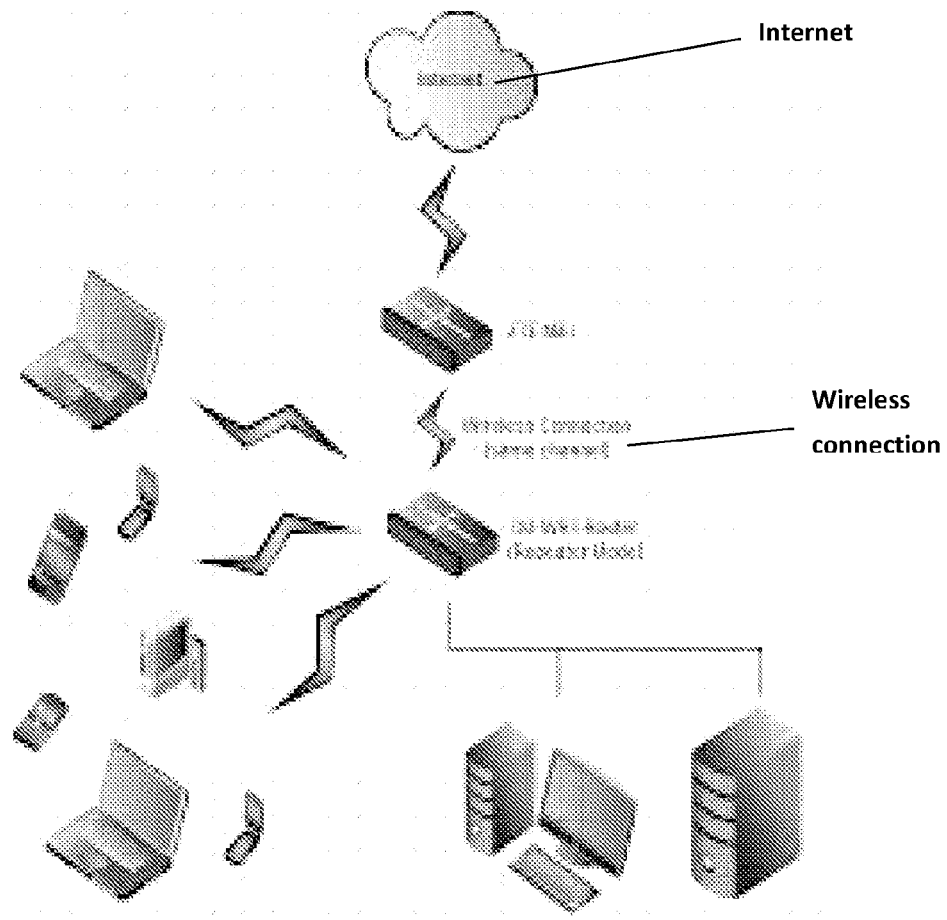
FIG. 6 showsan example of devices that can be used to access the new routers.

FIG. 6 shows a diagram of devices (PC or mobile phones) whether portable or fixed through which the subscriber or user can access the new router. It shows the mechanism though which the user can access the new router and then access to the Internet. The user runs the system or the program related to this invention, so that the software loaded on devices search for available lines until the subscriber selects one of the lines of the new routers in order for the subscriber to enter the internet.

Figure 7:
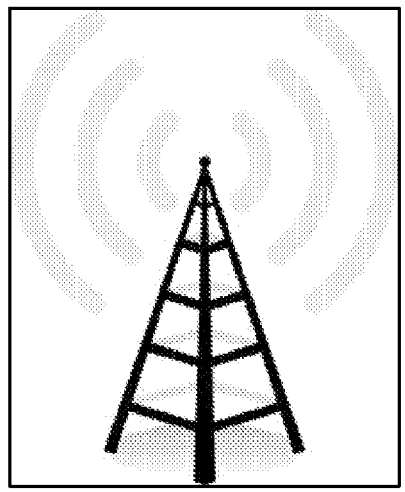
FIG. 7 shows a tower many of which will be distributed in the territory in which the system is applied.

FIG. 7 shows a tower many of which will be distributed in any territory applying the new system to distribute the Internet service. The role of these towers is to capture waves of Wi-Fi and Wimax or other wireless networks for this purpose and rebroadcast over greater distances and network coverage to cover all regions which use the new system. The towers can be mounted on the roofs of buildings or other appropriate places for the purpose of strengthening the broadcast.

Another feature of the new routers is when they pick up waves they re-broadcast for greater distances without adding new lines from the service provider only if these lines were to new users. This type of router can be installed in malls or private or government departments in order to provide and facilitate clients requirements. Visitors to the private or public centers or other place can access thousands of lines that will be available by this new routers without that any additional expenses by subscribers.

Figure 8:
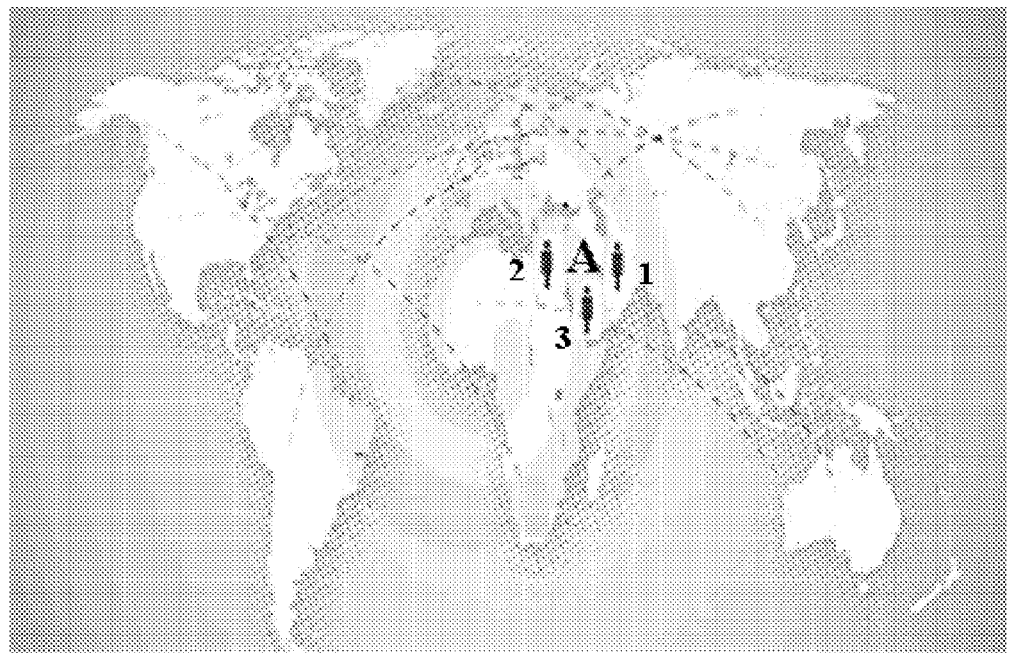
FIG. 8 shows how the system would work with the new routers starting from the subscriber to the service provider or the main server that connects the system with new routers.

FIG. 8 shows that if a person received a service through an original point of his entry from the same region and went to area "A1" and then went to area "A2" and then went to a government center "A3", through the new system of new routers and or servers, the system "My Line Follows Me" moves with him. Then he can communicate with these new routers through the system program which will search in the available servers in the place where he is, to display it on the cellular screen as an example, and access to the Internet through the router and open his own e-mail or other services available on the Internet.

Figure 9:
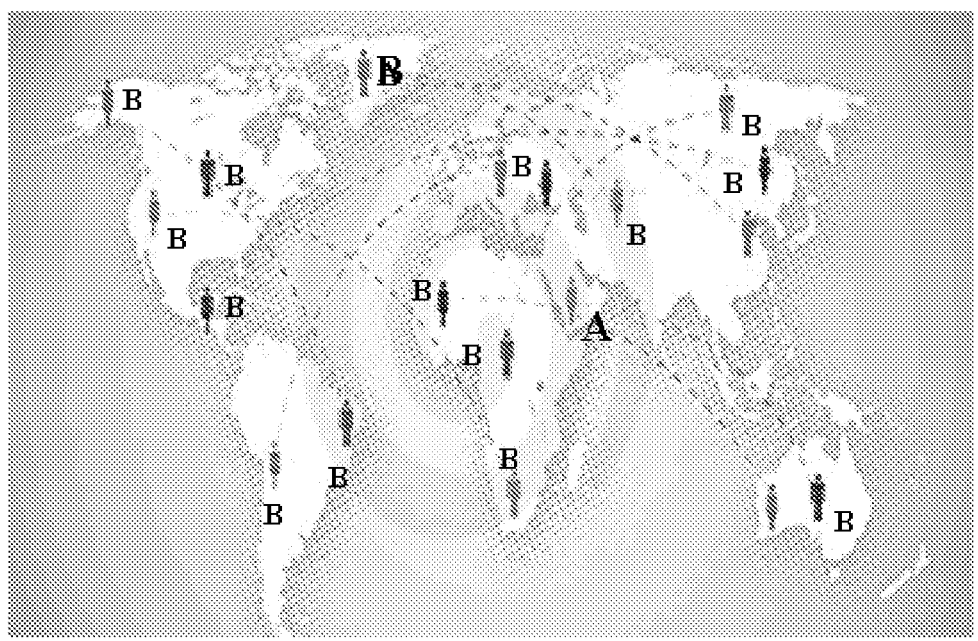
FIG. 9 shows how the system works with the new routers, starting from the subscriber to the service provider or the main server, which connects the system's components with the new routers, in the case where the subscriber or user has shifted to a territory in another country.

FIG. 9 shows the system for a user that had received the service from territory of country "A" and traveled to another territory in country "B". In this case, the IP address which belongs to him will move with him with the same secret number. This secret number can be used for any line usage for the line from the territory "A" and for his online line from the country Service Provider of the territory "B" without incurring any delay or disruption or without paying any additional expenses due to be used for his Internet line network in the present invention.

The person can approach and connect with other sites than those to which he was communicated before in his home territory "A" even if he traveled to the territory "B" because the inventive system uses the Internet line through its IP address of his territory of the country "A" through this new system of the new routers.

Features of the New Routers:
A—The new generation of routers which are installed in homes or residential complexes or commercial centers have a characteristic not available in the currently used routers in accessing online as in the prior art, the new characteristic being to allow more than one user with different accounts to enter or access the internet through the dedicated public area.

B—The new generation of routers have characteristics of "Bandwidth Balancing". This means that the subscriber can use all the properties of his account if he uses the new generation of routers. This applies even if the user is in another place and even if at the entry point to the subscriber or original user when requested the Internet service in place. In spite of this, the communication in the internet service in the new system does not depend on determining original point of entry of the user or subscriber but the presence of the user or subscriber where the new routers and servers exist in the system.

C—Routers can distribute waves over WiFi and or Wimax and/or any other wireless waves in order to cover a wide range of wireless waves. In this way subscribers can use the Internet through this new system for the expansion of Internet networks by the new generation of Routers, as these Routers have a self-strengthening effect or cooperate with each other like rings or circles covering all the territory in which the system is applied. It is possible to provide additional strengthening devices from the same router groups according to the needs of the requirements and of the required strengthening.

D—The inventive system provides a system or program for the person to open an account and enter data of the new router. This data will be entered by the person manually or automatically like opening an e-mail personal account, he must chooses the service provider with which he wants to establish an e-mail for example. This could be a Google account or Yahoo account or any other e-mail provider. The same idea applies to this invention, the person opens an account for his email under any of the email service providers, and after the completion of all the requirements he gets the user name and password. Likewise in this invention, after completion of all requirements he gets a user name and password for the wireless network to this system through service providers. After that he will be eligible to use wireless networks from anywhere in the territory or outside through the system, for example. So if a person is in the territory in the region (a) went to area (b) or (c) or other areas of the state or territory, or even traveled to outside its territory, the system will move with him as moving e-mail to someone, even though the person created his e-mail in a country which is not the same where he is now. If a person wanted to go to a territory outside the state where his e-mail account has been set up, and went to another territory and wanted to open his e-mail, he opens his apparatus, either Mobile Phone or computer or devices which provide the online access to review his e-mail.

The same way in the new system of the present invention, the user creates an account in any country through the Internet service providers and can access online from anywhere in the world, whether private home or mall or restaurant through the new router which has characteristics to allow more than one account/subscriber at the same time or any time he wants, whereas in the prior art there are no characteristics to join more subscribers with different accounts on the same router because the known router type allows only to set up one account/or number of subscriber under the same account and only one user can benefit from Internet service through this router, and will not be entered into another account on the router to another subscriber. However, in the new system the user can use the new router or the server through the system program and use this feature to enter a user name and password given to the user by the service provider or other in the country that has established the Internet account, even if he is far away from the original point of entry. Thus, the user can access the Internet by the new routers that are adapted to enter them for more than subscriber even if their accounts are different, and whether or not the person is in his country or traveled to other territory in another country where the new system of the new router is established.

General Description of the Invention:

This invention provides a new generation of routers that have a characteristic access or entry of more than one user even if their accounts are different on the same router, and an account "My Line follows me" is created according to this system. The data is user or subscriber data and information relating to the router (PHYSICAL ADDRESS OR SERIAL NUMBER) or other data required for the performance of the system, in addition to the program which is loaded on the mobile phone or a computer or laptop or any other device suitable for accessing the Internet. One of the advantages of this program is to show available networks so that the subscriber and/or user can access to one of these lines. After selecting a network, the program opens a screen "BROWSING" where data entry is required, for example entering username and password.

This information is installed permanently or when each new entry is made on the network of the user's machine, whether this is a mobile phone, or computer or other device that can access online use. In this case, the person will be eligible to access the Internet from any geographic region of the state or outside the state, or from any other destination in the world. For example, (First Example) if the person is inside a commercial center and wants to open and browse his e-mail, he needs to use the Internet to access the e-mail, In this case he has to run the system software "My Line Follows Me" through his computer, using his cell phone or his computer or any device capable of Internet use. Then a networks search will be done by which the new generation of the routers in the surroundings will appear on the program "My Line Follows Me", and the Router or server will be selected to access the Internet. Next will appear a screen to enter the user name and password provided by the Internet Service Provider, and after entering the user name and password correctly and successfully, the service will have access to the Internet and use its services as shown in FIG. 8.

The second example is if a person is present within the territory of his country and established an account under the new system in his country, then wanted to travel to several countries and wanted to browse e-mail. In this case he needs to use the Internet to access e-mail. For this, he runs the system software "My Line Follow Me" through his computer, using his cell phone or his computer or any device capable of Internet use by him, then performs a networks search whereby the new generation of routers in the surroundings will appear on the program "My Line Follows Me". The user selects the Router to access the Internet. Next will appear a screen to enter the user name and password provided by the Internet Service Provider, and after entering the user name and password correctly and successfully, the service will access the Internet and use its services as shown in FIG. 9.

The new routers have features that give online access to more than one person. These routers have access to more than one user even if they have different accounts on the same router or server. This feature is not available in current routers or in the prior art. For example, the user (X) is in territory (C) of his country while his router (new generation router) is available in the region (A) of the geographical distribution of his area. When this person accesses his account by the service provider of any router of the new generation in the territory (C), it will use account details on this new router located in the territory (C) and which is away from his home, which is in the territory (A), without paying any additional expenses to the service provider except as agreed at the beginning of the contract.

The used method in the present invention is a way to enter online using the same Internet account contracted out with the service provider in the country and using the Internet through WiFi and or Wimax and or any other network. This gives better results to communicate/share/distribute in the network for the largest number of people on the territory without incurring expenses or additional fees. The system of the present invention allows a large degree of flexibility and great convenience to the user or the shop owner or mall or any other centers by choosing one of the lines to access the Internet, avoiding obstacles that existed in the past. For example, in the prior art it was required from the person who wanted to use the Internet outside home to take the permission from a shop owner and pay an additional fees or buy coffee or other goods to enable him to access the Internet through the router installed in that place. In order to implement this system, old routers shall be replaced with new generation routers, which have the property to allow access for more than one user even if their accounts are different, whereas with old routers, this is not possible because they allow to access only one account at a time.

And also the "Bandwidth Balancing" characteristics of the new generation of the new routers means that the subscriber can use all the properties of his account by using the new generation of the routers even if used in a place other than where he wants to use it.

For example, a user (X) in the territory (A) from his country owns his router (new generation) is in region (B) of the geographical distribution of his area. When he accesses with his personal account (provided by the service provider) any router from the new generation in the region (A), then he would use all the "Bandwidth" to his account. This means that he will transfer his "Bandwidth" with him wherever he wanted to log in to the new routers, and without paying any additional expenses to the service provider except as paid at the beginning of the contract.

The clearing process can be applied between the service providers that must be subject to the requirements of the new generation of new routers.

The clearing system or other systems regulate the relationship between the service providers through an electronic clearing or other systems for fees collection between the service providers who will organize the desired relationship.

Practical Application of the Method of the Invention

1—Create an account with any service providers who apply this new system with new generation of the new router that allows access for more that one user/subscriber with different accounts.

2—Provide the user/subscriber with an account number with username and password or other data if needed.

3—Provide the new router to the subscriber; this router has the property of being accessible for more than subscriber with different accounts at the same time.

4—Then each subscriber or user has to install a new device or router, in his home or office or shop or in another place.

5—For example, there are three subscribers A, B, and C, and subscriber A was in territory "1" in a country and he shifted to territory "2" in the same country; subscriber B was in territory "2" and he shifted to territory "3" in the same country, and subscriber C was in territory "3" and he shifted to territory "4" in the same country.

6—In order to allow each subscriber to access the Internet through the new system of the new routers, the user first has to install and run the system's program "My Line Follow Me" which program searches for available networks and lines through the "Browser" and the user selects any of these lines so that he can access and log in the Internet.

7—For example, if that person was in territory (A) and created an account for the internet in this territory, then he went or traveled to other geographic area territory (B) that applies this system or invention, and he visited a mall or center or anywhere where there are such new routers or servers, then through this system/invention he can access or login to the Internet using his Internet account which was created in territory (A). If he went to territory (B) in another country, and wants to use the online service or internet in a commercial center in territory (B) in the other country, he first has to install and run the system program "My Line Follows me". This program will search for the nearest router of the new generation that offers Internet service "approach" or "follow me" in this area using a search engine for this program looking for routers which apply the new system and displays them spontaneously to a user or subscriber whatever the device is. The user then selects a router that appears on his screen (Browser) and asks him to enter a user name and password or any data required by the Service Provider. After entering the data correctly and successfully the router will allow him to access the Internet service knowing that he is in another area in the same territory. The system also regulates the relationship between Internet service providers on the local or international level through electronic clearing or any other system to organize financial or other aspects.

The inventive system involves the following features and characteristics.

The system comprises routers of a new generation, where the new routers return data in reverse to a main router that connects all subsidiary routers of subscribers or users in the system, for all data and information to subscribers on the network to be used by the subscribers in the system, where the new routers send those data through a WiFi or Wimax-wave or through any other network strengthened through external or internal towers to provide range coverage over all the territory that applies the system through new routers which have property of being accessible for more than one user or subscriber even if their accounts are different on the same router. An account is created for each user or subscriber in order to enter any new router according to this invention by Username or user ID or password or other data required to access to the Internet and network usage. This applies whether the person is a resident in the territory of entry or a person who left the place of entry to go to another part of the territory of country or left for the territory of another country. The Internet will be followed wherever in whatever territory, like in the case of e-mail, the e-mail is present wherever the person is found, the same applies to the system with new routers, the Internet being available where there are new routers that give access to the Internet after entering the user's name and password or other data as required.

The new routers may be found at Internet service providers, often a government owned company or a private or semi-governmental organization, where the new system is installed with these new routers with the feature and property of being accessible to more than one subscriber even if their accounts are different.

The new routers can also be located with a company other than Internet service providers mainly so that all these processes are far from Internet service providers, and the server at these companies acts as a gateway for all system operations and subscriptions for the new system of the New Routers.

The system of new routers has the characteristics and property to log in or access to more than subscriber or user even if their accounts were on the same router.

In the system of new routers, subscribers can have access from anywhere using their personal accounts on the routers without identifying the account's spatial position, where his personal account is in the original position.

In the System and method of the new routers, the user or subscriber needs to create an account, that consists of a user or subscriber data and information relating to the router's "physical address" or other data.

The user or subscriber can download software related to the system and the method of the new routers, to a cellular device or laptop or computer or any other device that provides access to the internet. In this case, the user or subscriber can select a line or lines that are displayed on the screen though the program "Browse" on the cellular device or on any hardware device that provides access to the Internet.

The new generation of routers can be installed at homes or residential communities or commercial centers, which allows more than one user to log in or access their different accounts on the Internet.

The routers can distribute waves over Wi-Fi or Wimax or other radio waves, so that they can cover the widest territory in which the system is applied.

The routers can be arranged to self-strengthen and connect among themselves as rings or circles covering all the territory in which the system is applied.

In the inventive system and method of the new routers, a subscriber account can be created like creating an email account, where the email ID moves with the user wherever he moves. So like if the subscriber wants to check his email he must enter his email user ID and password the same way with the new routers. If the subscriber is in a business center and he wants to access the Internet, then he has to enter his user ID and password to access the email and explore the emails.

The invention claimed is:

1. A system for providing, wherever the system is deployed, access to the Internet by public users who have subscribed to the system, the system comprising;
    a network of new routers deployed over a wide geographical territory, wherein each new router of the system has at least one Central Processing Unit (CPU) which has or is associated with two separately accessible distinct areas with different access possibilities to the respective areas, namely:
    a first area which is a private area that allows access only to the new router's owner or possessor, said private area having an Internet Protocol (IP) address for the router's owner or possessor to access said private area and hence access the Internet;
    a second area which is a public area that allows simultaneous access by more than one account each account being identified by an account identifier, said public area having an IP address which is reserved for said public users who have subscribed to the system and have an account identifier, for accessing the new router's public area and hence access to the Internet wherever the system is deployed; and
    a public user account server wherein public users located in different territories can each, from his own territory, open a user account identified by an identifier; and
    wherein the system is so arranged that any public user with a pre-registered user account identified by an account identifier, can access the Internet from any new router in the network from any location where new routers of the system are deployed by connecting to the public area of a new router's CPU and entering the account identifier of the pre-registered user account.

2. The system according to claim 1, wherein the new router comprises two CPU's, one with a private area and the other with a public area.

3. The system according to claim 1, wherein the new router's CPU or CPUs comprise(s) a plurality of public and private areas.

4. The system according to claim 1, wherein at least the public area of the new router's CPU is provided by means of a USB dongle connected to a USB connector of an existing router or built-in the CPU of a new router, where the existing router or new router provides a private area.

5. The system according to claim 1, wherein servers and/or sub-servers of the system are arranged to provide each public user with a user account with software that is arranged to search for new routers which are available in any territory and provide a list of available new routers for selection by the user.

6. The system according to claim 1, wherein each public user account has its own bandwidth.

7. The system according to claim 1, comprising application software that is installable on mobile devices, laptops, computers, handheld devices, smart mobile phones, or any other device.

8. The system according to claim 1, wherein servers and/or sub-servers of the system are arranged to allow public users to login and register on the system and provide the public users with said account identifiers.

9. A new router of a system according to claim 1 for providing, wherever the new router is deployed in the system, access to the Internet by public users who have subscribed to the system, wherein the new router has at least one Central Processing Unit (CPU) which has or is associated with two separately accessible areas with different access possibilities to the respective areas, namely:
    a first area which is a private area that allows access only to the new router's owner or possessor, said private area having an Internet Protocol (IP) address for the router's owner or possessor to access said private area and hence access the Internet; and
    a second area which is a public area that allows simultaneous access by more than one account each account being identified by an account identifier, said public area having an IP address which is reserved for public users who have subscribed to the system and have a said account identifier, for accessing the new router's public area wherever the system is deployed and hence access to the Internet,
    wherein the new router is so arranged that any public user with a pre-registered user account identified by an account identifier, can access the Internet from the new router from any location where the new router is deployed by connecting to the public area of the new router's CPU and entering the account identifier of the pre-registered user account.

10. The system according to claim 6, wherein the bandwidth of a public user account or part of said bandwidth can be shared or shifted by the new routers in the public area.

11. The new router according to claim 9, which comprises two CPU's, one with a private area and the other with a public area.

* * * * *